United States Patent
Yoon

(10) Patent No.: US 8,186,831 B2
(45) Date of Patent: May 29, 2012

(54) WIDE COLOR GAMUT PROJECTOR

(75) Inventor: Youngshik Yoon, Valencia, CA (US)

(73) Assignee: Thomson Licensing, Boulogne-Billancourt (FR)

( * ) Notice: Subject to any disclaimer, the term of this patent is extended or adjusted under 35 U.S.C. 154(b) by 293 days.

(21) Appl. No.: 12/312,998

(22) PCT Filed: Dec. 18, 2006

(86) PCT No.: PCT/US2006/048140
§ 371 (c)(1),
(2), (4) Date: Jun. 3, 2009

(87) PCT Pub. No.: WO2008/076104
PCT Pub. Date: Jun. 26, 2008

(65) Prior Publication Data
US 2010/0315596 A1   Dec. 16, 2010

(51) Int. Cl.
G02B 27/14 (2006.01)
G02B 27/28 (2006.01)
G03B 21/14 (2006.01)

(52) U.S. Cl. ............... 353/20; 353/33; 353/34; 353/37; 353/81; 353/82

(58) Field of Classification Search .................... 353/20, 353/30, 33, 34, 81; 359/634; 348/337–339
See application file for complete search history.

(56) References Cited

U.S. PATENT DOCUMENTS

| | | | |
|---|---|---|---|
| 3,704,061 A | 11/1972 | Travis | |
| 5,555,035 A | 9/1996 | Mead et al. | |
| 5,903,304 A | 5/1999 | Deter | |
| 6,515,734 B1 | 2/2003 | Yamada et al. | |
| 6,644,813 B1 | 11/2003 | Bowron | |
| 6,648,475 B1 | 11/2003 | Roddy et al. | |
| 6,799,851 B2 | 10/2004 | Yoon | |
| 6,863,400 B1 | 3/2005 | Liang | |
| 2001/0024268 A1 | 9/2001 | Fielding et al. | |
| 2002/0008770 A1 | 1/2002 | Ho et al. | |
| 2004/0100589 A1 | 5/2004 | Ben-David et al. | |
| 2004/0130682 A1 | 7/2004 | Tomita | |
| 2005/0088629 A1 | 4/2005 | Greenberg et al. | |
| 2005/0168708 A1 | 8/2005 | Huang | |
| 2005/0237487 A1 | 10/2005 | Chang | |
| 2006/0038964 A1 | 2/2006 | Lu et al. | |
| 2006/0039068 A1 | 2/2006 | Tokita et al. | |
| 2006/0044525 A1 | 3/2006 | Lee et al. | |
| 2006/0152524 A1 | 7/2006 | Miller et al. | |
| 2010/0104260 A1* | 4/2010 | Yoon et al. ..................... | 386/94 |

FOREIGN PATENT DOCUMENTS

| | | |
|---|---|---|
| DE | 19626097 | 10/1997 |
| FR | 2872924 | 1/2006 |
| JP | 8289218 | 11/1996 |
| JP | 10268230 | 10/1998 |
| JP | 2002-287247 A2 | 10/2002 |
| JP | 2005241904 | 9/2005 |
| WO | WO9800746 | 1/1998 |
| WO | WO0191471 | 11/2001 |
| WO | WO2004040899 | 5/2004 |
| WO | WO2006057001 | 6/2006 |
| WO | WO2006118881 | 11/2006 |

* cited by examiner

*Primary Examiner* — Tony Ko
(74) *Attorney, Agent, or Firm* — Robert D. Shedd; Harvey D. Fried; Richard LaPeruta

(57) ABSTRACT

A wide color gamut projector having a plurality of dichroic prisms configured to split a light beam into six primary color components and direct each of the six primary color components to separate digital micromirror devices is disclosed. The projector further comprises a translucent rotatable drum having different polarization sections, wherein the light beam is capable of being passed orthogonally through a wall of the drum.

20 Claims, 3 Drawing Sheets

WIDE COLOR GAMUT PROJECTOR

This application claims the benefit, under 35 U.S.C. §365 of International Application PCT/US2006/048140, filed Dec. 18, 2006 which was published in accordance with PCT Article 21(2) on Jun. 26, 2008 in English.

FIELD OF THE INVENTION

The invention relates generally to the projection of images. More specifically, the invention relates to the projection of images with a wide color gamut.

BACKGROUND OF THE INVENTION

It is well known that a projected image may be enhanced with an appearance of depth by converting the projected image into a so-called 3D image. This is generally accomplished by optically polarizing the images which are to be viewed by a viewer's left eye differently than the images which are to be viewed by a viewer's right eye. The 3D effect is perceived by the viewer when the viewer views the polarized images through the use of polarized filter lenses, commonly configured as '3D viewing glasses' with a polarized filter for use with the left eye of the viewer and a differently polarized filter for use with the right eye of the viewer. When the 3D viewing glasses are used to view the 3D images, the left eye of the viewer sees only the light polarized appropriately for passage through the polarized filter associated with the left eye and the right eye of the viewer sees only the light polarized appropriately for passage through the polarized filter associated with the right eye of the viewer. The above described method of displaying 3D images is known as passive 3D viewing where the projector alternates the left eye information with the right eye information at double the typical frame rate and a screen/filter/polarizing blocker in front of the projector's lenses alternates the polarization of the projected image in such a way that the image of each eye passes through the corresponding polarizing filter of the pair of passive stereo glasses discussed above. An alternative to passive 3D viewing is active 3D viewing where each viewer wears glasses with LCD light shutters which work in synchronization with the projector so that when the projector displays the left eye image, the right eye shutter of the active stereo eyewear is closed, and vice versa. One problem with current systems for providing 3D images is that the projectionist must attach and configure an external special device to the standard projector, a costly and time consuming requirement which also leads to technical failure. Further, when the projectionist again desires to project only a 2D image, the special device must be manually removed or turned off. In addition, having such a device attached to the projector parallel to the projection lens surface introduces a risk that light will reflect back to the imagers from which the light originates, often causing lower picture quality in color productions and undesirable contrast ratio change in black & white productions.

Another problem with current 2D/3D projectors is that the color gamut achieved by typical single projector systems is not as extensive as intended by the director of the film. Referring now to FIG. 1 (Prior Art), a typical three color prism 100 is shown. Prism 100 is typically used with a three-chip digital micromirror device projector. As shown, a light beam 102 enters prism 100, and in reaction to known optical coating methods, is selectively reflected or transmitted depending on the wavelength of the light. Further, known total internal reflection techniques, such as providing a small air gap between prism 100 components (as shown with the use of the known type of total internal reflection prism at the top of prism 100), may be used to control the reflection of the divided components of light beam 100. After having been separated into three color components, each light beam 102 color component is directed to and selectively reflected out of prism 100 by a digital micromirror device. Particularly, digital micromirror device 104 reflects a blue color component of light beam 102, digital micromirror device 106 reflects a green color component of light beam 102, and digital micromirror device 108 reflects a red color component of light beam 102. Each digital micromirror device 104, 106, 108 may be individually controlled in a known manner to produced a combined color image which is projected from prism 100.

While there are many advanced methods of displaying images with a wide color gamut, room for improvement remains.

SUMMARY OF THE INVENTION

The present invention is directed to a wide color gamut projector having a plurality of dichroic prisms configured to split a light beam into six primary color components and direct each of the six primary color components to separate digital micromirror devices.

DETAILED DESCRIPTION OF THE INVENTION

Figure 1:
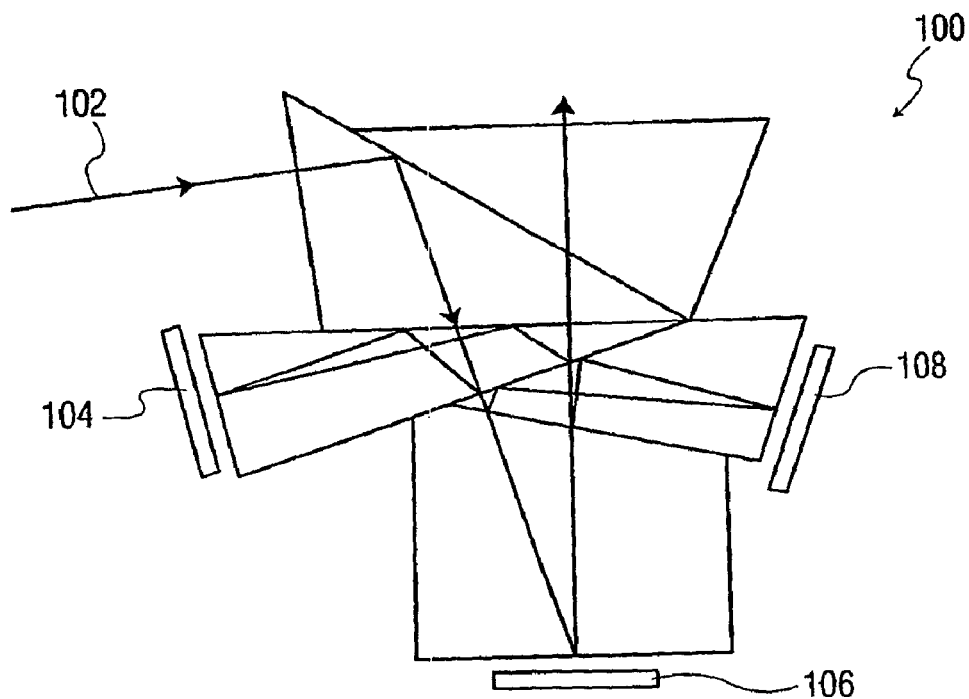
FIG. 1 is an orthogonal schematic illustration of a prism used for separating a light beam into three color components according to prior art.
Figure 2:
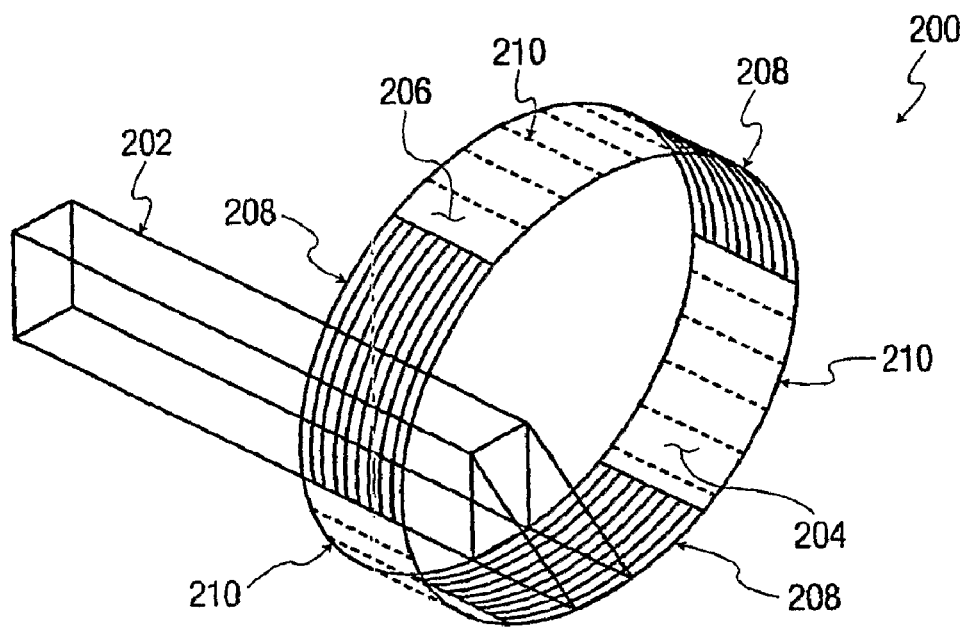
FIG. 2 is an oblique schematic illustration of a polarization drum or polarization hollow cylinder according to the present invention.

Referring now to FIG. 2 in the drawings, a polarizing drum (or otherwise called a polarization hollow cylinder) according to a first embodiment of the present invention is illustrated. Polarizing drum 200 is a rotatable drum-like structure formed of translucent materials. Drum 200 is shown as a flat band of material located in close proximity to a directional light transmission device (or light pipe) 202 for passing light through drum 200 by directing light generally orthogonal to an interior surface 204 of the drum 200 such that light passes through the translucent material and exits the drum 200 through an exterior surface 206 of the drum 200 (through a wall of the drum). As shown, the drum is divided into radially alternating P-polarization sections 208 (or clockwise circular polarization sections) and S-polarization sections 210 (or counter-clockwise circular polarization sections). In operation, a 2D image may be converted to a 3D image by transmitting the 2D image through the directional light transmission device 202 and subsequently through the polarization drum 200 while drum 200 is rotated about its central axis. The drum 200 is rotated at a controlled speed so as to appropriately polarize each frame of images as either P-polarization or S-polarization by passing the image through sections 208, 210, respectively.

Figure 3:
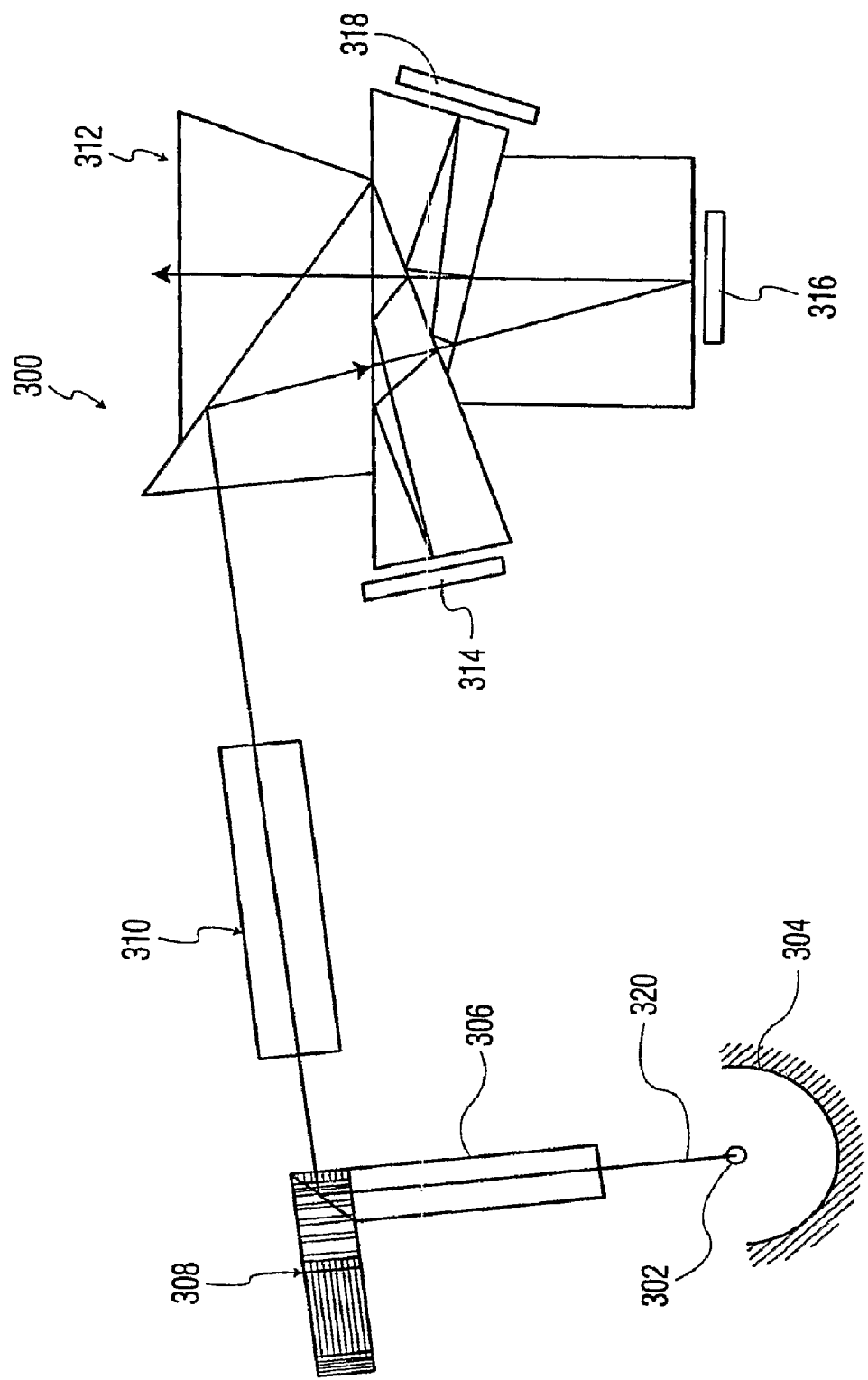
FIG. 3 is an orthogonal schematic illustration of a 3D projector according to the present invention.

Referring now to FIG. 3 in the drawings, a 3D projector according to the present invention is illustrated. Projector 300 comprises a light source 302 having a reflector 304, a directional light transmission device 306 similar to device 202, a polarizing drum 308 similar to drum 200, relay optics 310, a prism 312 similar to prism 100, and digital micromirror devices 314, 316, 318, similar to digital micromirror devices 104, 106, 108, respectively. In operation, light source 302 emits a light beam 320 into directional light transmission device 306 which then directs the light through polarizing drum 308 as polarizing drum 308 rotates about its central axis. The light beam 320 then travels through relay optics 310 which direct the light beam 320 into prism 312. Prism 312 divides the light beam 320 into separate color components and directs the color components of the light beam 320 onto digital micromirror devices 314, 316, 318, which are associated with the colors blue, green, and red, respectively. As described above, the color components of light beam 320 are then subsequently directed out of prism 312 by digital micromirror devices 314, 316, 318. The 3D image is perceived by a viewer of the projected image when the viewer wears polarized filter glasses (not shown) which allow only one of the P and S polarized portions of light through the glasses to each eye of the viewer. Of course, the projector should present approximately twice the number of frames per second in 3D mode as opposed to a normal 2D mode since each eye will only see every other frame. Alternatively, the projector can be used as a 2D projector by projecting image data containing only frames to be viewed by both eyes of the viewer simultaneously, by the viewer not wearing polarized filter glasses, and by optionally not rotating the polarization drum 306. The rotation and/or attachment of the polarizing drum to the projector 300 may optionally be controlled by software code and no further mechanical interaction by a user of the projector 300.

Figure 4:
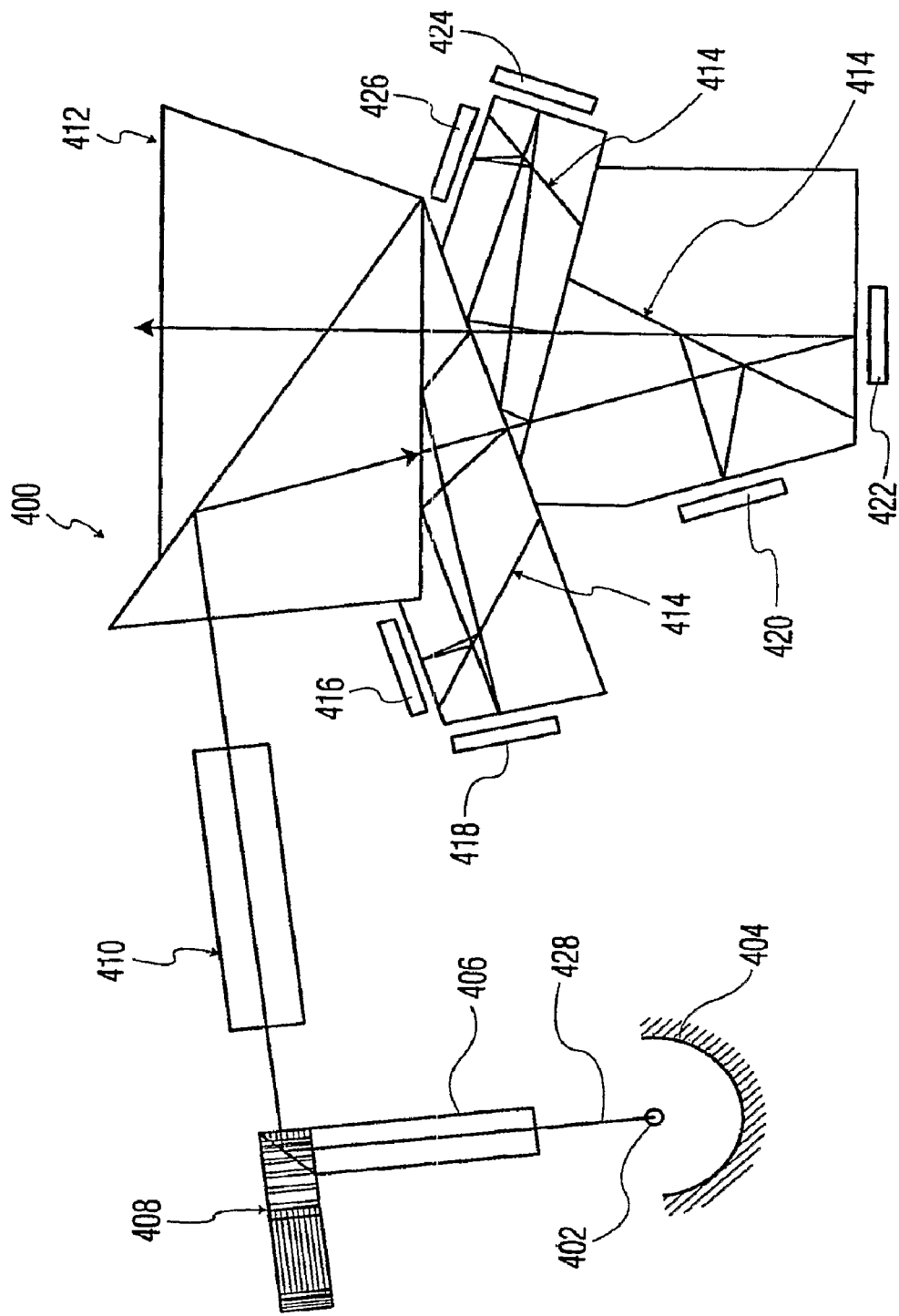
FIG. 4 is an orthogonal schematic illustration of a wide color gamut 3D projector according to the present invention.

Referring now to FIG. 4 in the drawings, a wide color gamut 3D projector (or color gamut 3D projector) according to the present invention is illustrated. Projector 400 comprises a light source 402 having a reflector 404, a directional light transmission device 406 similar to device 202, a polarizing drum 408 similar to drum 200, relay optics 410, a six primary color prism 412 similar in theory to prism 100, and digital micromirror devices similar to digital micromirror devices of prism 100. Prism 412 is different from prism 100 in that prism 412 divides a light beam into six primary color components rather than only three. This is accomplished by introducing 45 degreed dichroics 414 into each primary (such as red, green, and blue of prism 100) to create six primary color components for delivery to six digital micromirror devices, providing a wider color gamut and greater color control at a given refresh or frame rate. In this arrangement, a cyan, blue, yellow, green, red, and magenta color component is directed toward and reflected from digital micromirror devices 416, 418, 420, 422, 424, and 426, respectively. In operation, light source 402 emits a light beam 428 into directional light transmission device 406 which then directs the light through polarizing drum 408 as polarizing drum 408 rotates about its central axis. The light beam 428 then travels through relay optics 410 which direct the light beam 428 into prism 412. Prism 412 divides the light beam 428 into six separate color components and directs the cyan, blue, yellow, green, red, and magenta color components onto digital micromirror devices 416, 418, 420, 422, 424, and 426, respectively. As described above, the color components of light beam 428 are then subsequently directed out of prism 412 by digital micromirror devices 416, 418, 420, 422, 424, and 426 and eventually onto a display surface (not shown). The 3D image is perceived by a viewer of the projected image when the viewer wears polarized filter glasses (not shown) which allow only one of the P and S polarized portions of light through the glasses to each eye of the viewer. Of course, the projector should present approximately twice the number of frames per second in 3D mode as opposed to a normal 2D mode since each eye will only see every other frame. Alternatively, the projector can be used as a 2D projector by projecting image data containing only frames to be viewed by both eyes of the viewer simultaneously, by the viewer not wearing polarized filter glasses, and by optionally not rotating the polarization drum 406. Also, a 2D mode can be achieved by removing the drum or having a non-polarizing section on the drum and having the light pass through that section, which would yield greater brightness.

It will be appreciated that in alternative embodiments of the present invention, a wide color gamut projector may not be enabled to create 3D images. Specifically, alternative embodiments of the present invention include a wide color gamut projector substantially similar to projector 400, but comprising no rotating drum. Further, where a wide color gamut projector comprises no rotating drum, the wide color gamut projector may also comprise no directional light transmission device. Instead of using a directional light transmission device to direct light from a light source into relay optics, the light source may be configured to emit light into relay optics without the need for a directional light transmission device.

It is to be understood that although six separate polarization portions are shown in FIG. 2, a smaller or greater number of different separate polarization portions can be utilized. Further, although the polarization sections are generally designed to not be color filters, embodiments where the polarization sections are also color filters is considered be an aspect of the invention. Further, although the examples of the use of 3 and 6 digital microdevices are provided herein, other numbers of digital microdevices greater than 3 are considered embodiments of the invention wherein each digital microdevice is dedicated to a different portion of the spectrum with respect to the other digital microdevices. Here, each different portion of the spectrum is considered a primary color component.

An aspect of the invention also includes the method of display wide color gamut images. The method comprises directing a light beam into a plurality of dichroic prisms; splitting the light beam into six primary color components; and directing each of the six primary color components to separate digital micromirror devices and onto a display surface. Alternatively, prior to directing the light beam into the plurality of dichroic prisms, the light is directed through a total internal reflection prism.

The foregoing illustrates only some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

The invention claimed is:
1. A color gamut projector comprising:
a plurality of separate digital micromirror devices; and
a plurality of dichroic prisms configured to split a light beam into six primary color components and direct each of the six primary color components to the separate digital micromirror devices.
2. The color gamut projector according to claim 1, wherein the six primary color components comprise a cyan color component, a blue color component, a yellow color component, a green color component, a red color component, and a magenta color component.

3. The color gamut projector according to claim 1, wherein the color components are reflected from the digital micromirror devices onto a display surface.

4. The color gamut projector according to claim 1, wherein the light beam is emitted by a single light source.

5. The color gamut projector according to claim 1, further comprising:
a total internal reflection prism for directing the light beam into the plurality of dichroic prisms.

6. The color gamut projector according to claim 1, wherein at least one of the plurality of dichroic prisms is a 45 degree dichroic prism.

7. The color gamut projector according to claim 1, further comprising:
a translucent rotatable drum having differently polarizing sections;
wherein the light beam is capable of being passed generally orthogonally through a wall of the drum.

8. The color gamut projector according to claim 7, wherein the light beam is passed through the wall of the drum as the drum is rotated about a central axis of the drum.

9. The color gamut projector according to claim 7, wherein the differently polarizing sections are either P-polarizing sections or S-polarizing sections.

10. The color gamut projector according to claim 9, wherein each P-polarized section is generally circumferentially bounded by S-polarizing sections and each S-polarizing section is generally circumferentially bounded by P-polarizing sections.

11. The color gamut projector according to claim 7, wherein the differently polarizing sections are either clockwise circularly polarizing sections or counter-clockwise circularly polarizing sections.

12. The color gamut projector according to claim 11, wherein each clockwise circularly polarizing section is generally circumferentially bounded by counter-clockwise circularly polarizing sections and each counter-clockwise circularly polarizing section is generally circumferentially bounded by clockwise circularly polarizing sections.

13. A prism assembly for a color gamut projector, comprising:
a plurality of dichroic prisms configured to split a light beam into six primary color components and direct each of the six primary color components to separate digital micromirror devices.

14. The prism assembly according to claim 13, wherein the six primary color components comprise a cyan color component, a blue color component, a yellow color component, a green color component, a red color component, and a magenta color component.

15. The prism assembly according to claim 13, further comprising:
a total internal reflection prism for directing the light beam into the plurality of dichroic prisms.

16. The prism assembly according to claim 13, wherein the color components are reflected from the digital micromirror devices onto a display surface.

17. The prism assembly according to claim 13, wherein at least one of the plurality of dichroic prisms is a 45 degreed dichroic prism.

18. A method of color gamut image projection, comprising the steps of:
directing a light beam into a plurality of dichroic prisms;
splitting the light beam into six primary color components; and
directing each of the six primary color components to separate digital micromirror devices.

19. The method of color gamut image projection according to claim 18, further comprising the step of:
directing each of the six primary color components from the digital micromirror devices onto a display surface.

20. The method of color gamut image projection according to claim 18, further comprising the step of:
before directing a light beam into the plurality of dichroic prisms, directing light through a total internal reflection prism.

* * * * *